US010529303B2

United States Patent
Li

(10) Patent No.: US 10,529,303 B2
(45) Date of Patent: Jan. 7, 2020

(54) DISPLAY DEVICE AND DISPLAY METHOD THEREOF

(71) Applicant: Beijing Xiaomi Mobile Software Co., Ltd., Haidian District, Beijing (CN)

(72) Inventor: Guo Sheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 149 days.

(21) Appl. No.: 15/799,730

(22) Filed: Oct. 31, 2017

(65) Prior Publication Data
US 2018/0122339 A1   May 3, 2018

(30) Foreign Application Priority Data

Oct. 31, 2016   (CN) .......................... 2016 1 0942895

(51) Int. Cl.
*G09G 5/38*   (2006.01)
*G06F 21/84*   (2013.01)
(Continued)

(52) U.S. Cl.
CPC .............. *G09G 5/38* (2013.01); *G06F 21/84* (2013.01); *G06K 9/00604* (2013.01);
(Continued)

(58) Field of Classification Search
CPC ............ G09G 5/38; G09G 5/003; G09G 3/20; G09G 2320/028; G09G 2354/00;
(Continued)

(56) References Cited

U.S. PATENT DOCUMENTS

2009/0224646 A1*   9/2009   Kim ................... G02B 27/2214
                                                                         313/245
2009/0243971 A1   10/2009   Uehara
(Continued)

FOREIGN PATENT DOCUMENTS

CN   102222492 A   10/2011
CN   102872589 A   1/2013
(Continued)

OTHER PUBLICATIONS

First Office Action issued in corresponding Chinese Application No. 201610942895.X dated Nov. 27, 2018, 9 pages.
(Continued)

*Primary Examiner* — Rodney Amadiz
(74) *Attorney, Agent, or Firm* — Arch & Lake LLP

(57) ABSTRACT

A display device and display method thereof are provided in the field of image displaying technology. The display device includes: a controller, a display driver and a barrier driver. The controller is configured to send an image frame to the display driver and send a first instruction to the barrier driver. The display driver is configured to drive the display panel to display the image frame on a plurality of display areas which are parallel and distributed at intervals. The barrier driver is configured to turn on the electrodes of the first display barriers in the barrier panel according to the first instruction. The first display barriers are configured to block light when energized. Apart from the first display barriers, second display barriers are configured to allow light to pass through. The display device thus provides a visible range within a preset narrow viewing angle.

16 Claims, 5 Drawing Sheets

(51) Int. Cl.
*G06K 9/00* (2006.01)
*G09G 5/00* (2006.01)
*G09G 3/20* (2006.01)

(52) U.S. Cl.
CPC ........... *G06K 9/00832* (2013.01); *G09G 3/20* (2013.01); *G09G 5/003* (2013.01); *G09G 2310/08* (2013.01); *G09G 2320/028* (2013.01); *G09G 2354/00* (2013.01); *G09G 2358/00* (2013.01)

(58) Field of Classification Search
CPC ........... G09G 2310/08; G09G 2358/00; G06K 9/00832; G06K 9/00604; G06F 21/84
See application file for complete search history.

(56) References Cited

U.S. PATENT DOCUMENTS

| | | | | |
|---|---|---|---|---|
| 2011/0159929 | A1* | 6/2011 | Karaoguz | H04N 21/4312 455/566 |
| 2011/0241983 | A1 | 10/2011 | Chang | |
| 2013/0229327 | A1* | 9/2013 | Lee | G02B 27/2214 345/58 |
| 2014/0022145 | A1 | 1/2014 | Sun et al. | |
| 2018/0203324 | A1 | 7/2018 | Li | |

FOREIGN PATENT DOCUMENTS

| | | |
|---|---|---|
| CN | 105702171 A | 6/2016 |
| CN | 205281069 U | 6/2016 |
| CN | 106054423 A | 10/2016 |

OTHER PUBLICATIONS

Search Report in corresponding European Patent Application No. 17199107.8, dated Aug. 8, 2018, 18 pages.

* cited by examiner

DISPLAY DEVICE AND DISPLAY METHOD THEREOF

CROSS-REFERENCE TO RELATED APPLICATION

This application claims priority to Chinese Patent Application No. 201610942895.X, filed with the Chinese Patent Office on Oct. 31, 2016 and titled "DISPLAY DEVICE AND DISPLAY METHOD THEREOF", the entire contents of which are incorporated herein by reference.

FIELD

The present disclosure relates to image displaying technology, and more particularly to a display device and display method thereof.

BACKGROUND

Display device is one of the most common input or output electronic devices. Display device is configured to display text, images, and videos.

Contemporary display device usually has a wide viewing angle screen. Its visible angle of view can be as wide as from approximately 120 to 170 degree. When users use these devices in bus, subway, or other crowded public places, the content on the screen can be easily exposed and visible to other people around, which may lead to serious privacy leaks.

SUMMARY

In order to reduce potential risk of data leak and privacy breach due to the high visibility and easy exposure of the content displayed on wide viewing angle display device to other people around when users use their devices in crowded places, the embodiments of the present disclosure provide a display device and display method thereof.

According to a first aspect of the present disclosure, a display device is provided herein. This device includes: a controller, a display driver and a barrier driver which are connected to the controller, a display panel which is connected to the display driver, and a barrier panel. The barrier panel is disposed above the display panel and connected to the barrier driver. The barrier panel includes a plurality of display barriers which are parallel and distributed adjacently in the barrier panel. The controller is configured to send an image frame to the display driver and send a first instruction to the barrier driver. The display driver is configured to drive the display panel to display the image frame on a plurality of display areas which are parallel and distributed at intervals. Each individual display area is configured to display the corresponding portion of the image frame. The barrier driver is configured to control one or more display barriers in the barrier panel according to the first instruction such that the image frame is at least partially blocked when viewed outside of a predetermined visible range.

According to a second aspect of the present disclosure, a display method is provided and applied to the above display device. In the method, the controller sends an image frame to the display driver and a first instruction to the barrier driver. The display driver drives the display panel to display the image frame on the display areas which are parallel and distributed at intervals. Each individual display area is configured to display its corresponding portion of the image frame. The barrier driver controls one or more display barriers in the barrier panel according to the first instruction such that the image frame is at least partially blocked when viewed outside of a predetermined visible range.

According to a third aspect of the present disclosure, a display device is provided. The display device includes: a controller, a display driver and a barrier driver which are connected to the controller; a display panel which is connected to the display driver; and a barrier panel disposed above the display panel and connected to the barrier driver, wherein a plurality of display barriers are parallel and distributed adjacently in the barrier panel. The display barriers are configured to block light when the electrodes are in an on state. The display barriers are configured to allow light to pass through when the electrodes are in an off state.

Understandably, the foregoing general description and the following detailed description are only exemplary and explanatory, and do not limit the scope of the present disclosure.

BRIEF DESCRIPTION OF THE DRAWINGS

The drawings herein are incorporated in and constitute a part of this specification, showing the embodiments of the present disclosure and, together with the specification, utilized to explain the principles of the present disclosure.

DETAILED DESCRIPTION OF THE EMBODIMENTS

Figure 1:
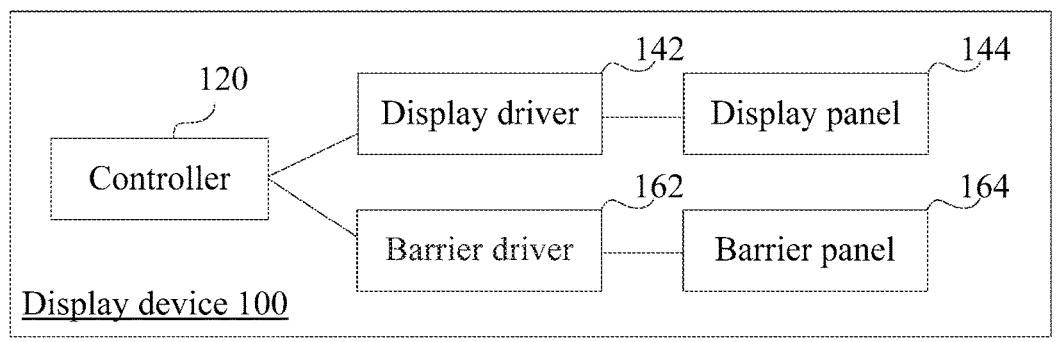
FIG. 1 is a block diagram of a display device shown in accordance with an aspect of the disclosure.

Hereinafter, exemplary embodiments will be described in detail. The embodiments are shown in the drawings. In the following description when referring to the drawings, the same numerals in the different drawings denote the same or similar elements, unless otherwise indicated. The embodiments described in the following exemplary embodiments are not representative of all embodiments consistent with the present disclosure. Rather, they are merely examples of devices and methods consistent with some aspects of the present disclosure as detailed in the claims.

A display device with a relative narrow viewing angle and a display method are provided by the embodiments of the present disclosure, wherein the display device can be any kind of electronic devices with a display screen, such as mobile phones, tablets, etc.

FIG. 1 is a block diagram of a display device 100 shown in accordance with an exemplary embodiment. The viewing angle of display device 100 can be narrowed through parallax barrier.

As shown in FIG. 1, the display device includes: a controller 120, a display driver 142 and a barrier driver 162, both of which are connected to the controller 120. The display device further includes a display panel 144 and a barrier panel 164. The display panel 144 is connected to the display driver 142. The barrier panel 164 is disposed above the display panel 144 and connected to the barrier driver 162.

Optionally, the controller 120 can be a central processing unit (CPU) and/or a graphics processing unit (GPU). The controller 120 has the ability to output and display the image frame and send control instructions.

The display driver 142 includes a driver circuit which drives the display panel 144 to display content. The display panel 144 can be a liquid crystal display (LCD) panel or an organic light-emitting diodes (OLED) panel.

Optionally, when the display panel 144 is a LCD panel, the display device 100 also includes the backlight behind the LCD panel. Since the LCD does not emit light itself, it may be used in combination with a backlight.

Optionally, when the display panel 144 is an OLED panel, no additional backlight is needed since the OLED emits light itself.

Taking the LCD panel as an example, the LCD panel includes backlight, a lower polarizer, an array glass substrate (thin film transistor), a liquid crystal cell, a color filter, and an upper polarizer which are arranged parallel in sequence.

When the voltage or signal on the thin film transistor changes, the liquid crystal molecules in the crystal cell will change their directions. Liquid crystal molecules have optical rotation effects. Normally, liquid crystal molecules are arranged in sequence and will not change their diffusion directions when light passes through. When an electric field is applied, the liquid crystal molecules are in disorder. A portion of the liquid crystal molecules will change their diffusion directions and the upper polarize and the lower polarize will block the light from a specific direction, resulting in color shade which can be controlled by the color filter. Light emitted from the backlight passes through the lower polarizer, the array glass substrate, the crystal cell, the color filter and the upper polarizer to display the corresponding images.

The barrier driver 162 includes a driver circuit, which is configured to send a drive signal to the barrier panel 164 and control the barrier panel 164 to at least partially block the display content on the lower part of the panel. Several display barriers are parallel and distributed adjacently in the barrier panel 164, i.e. there are no gaps between the two adjacent display barriers. The display barriers in the barrier panel 164 are able to block the display content on the lower part of the panel. When the electrode of each display barrier in the barrier panel 164 is in an on state, the panel blocks light; otherwise when the electrode is in an off state, the panel allows light to pass through. When the electrode of the first display barrier which is at either odd or even number position in the barrier panel 164 is in on state, there is a second display barrier whose electrode is in off state between any two adjacent first display barriers whose electrodes are in on state. That is to say, one second display barrier is located between two adjacent first display barriers.

In the present disclosure, the first display barrier is the display barrier whose electrode is in an on state in the barrier panel 164; the second display barrier is the display barrier whose electrode is in an off state. The first display barriers and the second display barriers are interleaved with each other. For example, when the first display barrier is located at odd number position, the second display barrier is located at even number position. Alternatively, when the first display barrier is located at even number position, the second display barrier is located at odd number position.

The controller 120 is configured to send the first instruction to barrier driver 162. The first instruction is configured to trigger the functionality of the narrow viewing angle and switch a wide viewing angle screen to a narrow viewing angle screen. The barrier driver 162 is configured to turn on the electrode of the first display barrier which is at either odd or even number position in the barrier panel 164 according to the first instruction. According to the first instruction, the barrier driver turns on the electrodes of the first display barriers in the barrier panel. The first display barriers are at either odd or even number positions in the barrier panel and configured to block light. Apart from the first display barriers, second display barriers are configured to allow light to pass through. Each display area displays its corresponding content that passes through the second display barriers and is viewable within the predetermined visible range.

For example, when the electrode of the first display barrier at odd number position in the barrier panel 164 is turned on by the barrier driver 162, the electrode of the second display barrier at even number position in the barrier panel 164 will be in an off state. In this case, the first display barriers at odd number positions in the barrier panel 164 are configured to block light and the second display barriers at even number positions are configured to allow light to pass through. Or, when the electrode of the first display barrier at even number position in the barrier panel 164 is turned on by the barrier driver 162, the electrode of the second display barrier at odd number position in the barrier panel 164 will be in the off state. In this case, the first display barriers at even number positions in the barrier panel 164 are configured to block light and the second display barriers at odd number positions are configured to allow light to pass through.

Figure 2A:
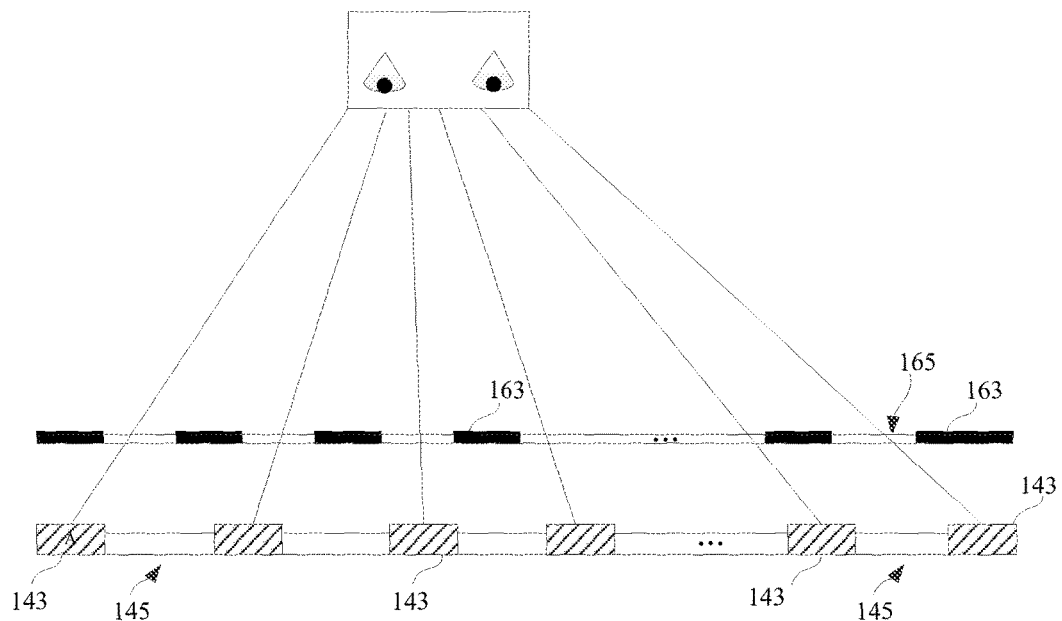
FIG. 2A is a schematic diagram of a display device according to an aspect of the disclosure.
Figure 2B:
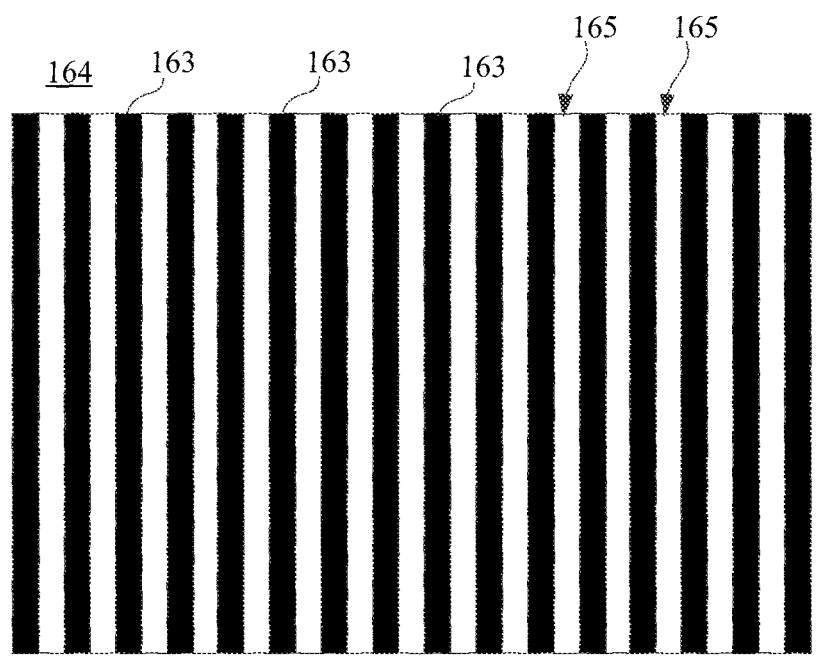
FIG. 2B is a schematic diagram of a barrier panel of the display device according to an aspect of the disclosure.

FIG. 2A illustrates the display device 100 in the present disclosure. As shown in FIG. 2A, the display device 100 includes the display panel 144 and the barrier panel 164. The barrier panel 164 is placed above the display panel 144. FIG. 2B is an illustration of the front of the barrier panel 164. The barrier panel 164 includes a first plurality of display barriers 163 interleaved with a second plurality of display barriers 165.

Figure 2C:
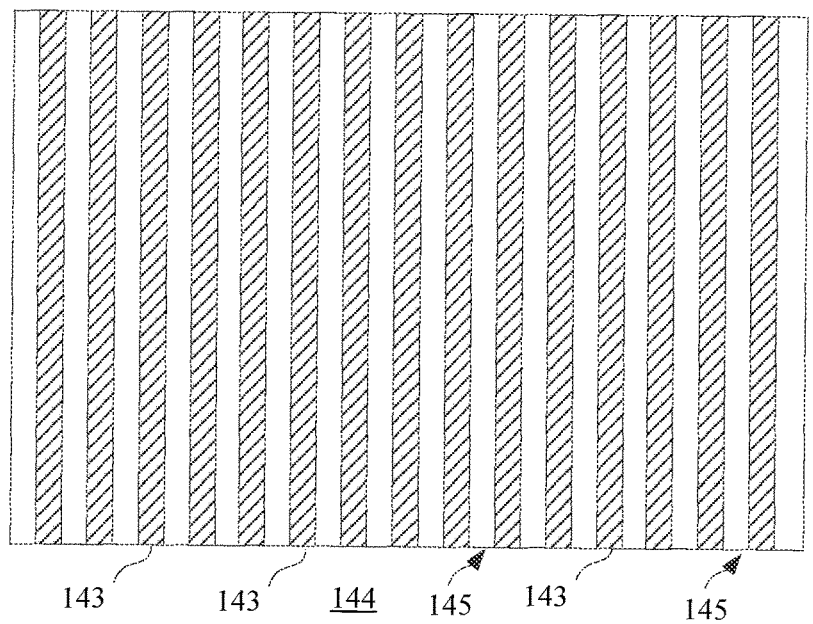
FIG. 2C is a schematic diagram of a display panel of the display device according to an aspect of the disclosure.

FIG. 2C illustrates the front of the display panel 144. The display panel 144 can be a liquid crystal display (LCD) panel or an organic light-emitting diodes (OLED) panel. The display panel 144 includes display areas 145 which are interleaved with display areas 143. For example, a display area 143 may be placed between two adjacent display areas 145.

The controller is configured to send the image frame to the display driver 142.

The display driver 142 is configured to drive the display panel 144 to display the image frame on the display areas 143 which are parallel and distributed at intervals. Each individual display area 143 is configured to display its content corresponding to portion of the image frame. The assembly of the content displayed on each display area 143 becomes the content of the image frame. In other words, the image frame is disassembled into pieces of display content, each piece will be displayed on one display area 143 and is directed to the predetermined visible range through the display barrier whose electrode is turned off in the barrier panel 164.

As shown in FIG. 2C, the front of display panel 144 may include multiple display areas 143. Each of the display areas 143 may have a rectangular shape. The idle display area 145 which is between two adjacent display areas 143 may not display any content.

Optionally, the controller 120 may be configured to send the second instruction to the barrier driver. The second instruction is configured to trigger the blocking functionality, which switches the barrier panel 164 to a state to block light completely. The barrier driver 162 is configured to turn on the electrode of each display barrier in the barrier panel 164. Once the blocking functionality is turned on, any content on the screen becomes invisible from any viewing angle.

Figure 3:
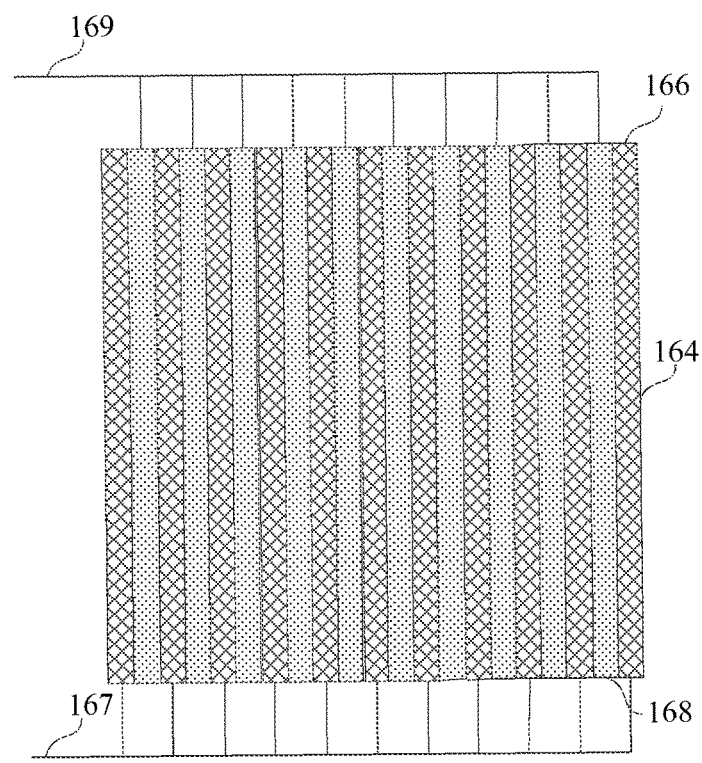
FIG. 3 is a schematic diagram of a connection between display barriers in the barrier panel and the signal line.

As shown in FIG. 3, the electrode of each display barrier 166 which is at odd number position in the barrier panel 164 is connected to the first signal line 167; the electrode of each display barrier 168 which is at even number position in the barrier panel 164 is connected to the second signal line 169. The barrier driver is configured to send the drive signal through the first signal line 167 to the display barrier 166 which is located at the odd number position in the barrier panel 164 and turn on the electrode of each display barrier 166 at odd number position. Or, the barrier driver is configured to send the drive signal through the second signal line 169 to the display barrier 168 which is located at the even number position in the barrier panel 164 and turn on the electrode of each display barrier 168 at even number position. Optionally, the drive signal can be the first instruction or the second instruction.

Optionally, when the barrier driver 162 sends a drive signal to the display barrier either through the first signal line 167 or the second signal line 169, it will trigger the functionality of the narrow viewing angle; when the barrier driver 162 sends a drive signal to the display barrier through both the first signal line 167 and the second signal line 169, it will trigger the functionality of blocking; when the barrier driver 162 does not send a drive signal to the display barrier, it will trigger the functionality of wide viewing angle.

Optionally, the first signal line 167 is wired on one side of the barrier panel 164 and the second signal line 169 is wired on the other side in order to avoid making wiring area too wide if both signal lines are wired on the same side of the panel.

In one or more embodiments, each display area 143 has the same width and length. For example, the length of each display area 143 is 1080 pixels and the width is 5 pixels. The idle area 145 between two adjacent display areas 143 has the same width and length as well. For example, the width of each idle area 145 is 3 pixels. In another possible embodiment, there are at least two display areas 143 that have the same length but different width. For example, the width of the display areas 143 in the central area of the display panel 144 is greater than the width of the display areas 143 in the marginal area of display panel 144. There are at least two idle areas 145 have the same length but different width. For example, the width of the idle areas 145 in the central area of the display panel 144 is greater than the width of the idle areas 145 in the marginal area of display panel 144. The present disclosure is not limited hereto.

In one possible embodiment, each display barrier 163 has the same width and length. For example, the length of each display barrier is 1080 pixels and the width is 2 pixels. In another possible embodiment, there are at least two display barriers 163 that have the same length but different width. For example, the width of the display barrier 163 in the central area of the barrier panel 164 is greater than the width of the display barrier 163 in the marginal area of barrier panel 164. Another example is that the width of the display barrier 163 at the odd number position in the barrier panel 164 is less than the width of the display barrier 165 at the even number position in the barrier panel 164. The present disclosure is not limited hereto.

Figure 4:
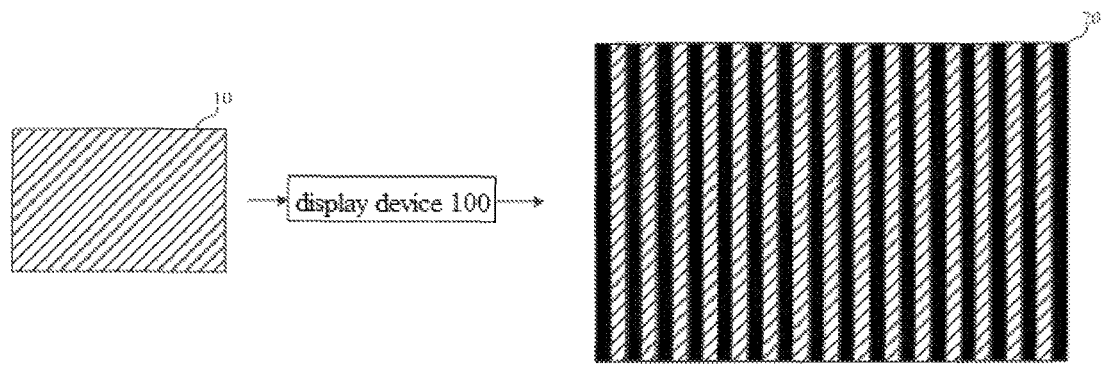
FIG. 4 is a schematic diagram of an effect of the image frames displayed on the display device.

Each display area 143 displays its corresponding content. The content is directed within the predetermined visible range through the display barrier 165 whose electrode is in an off state in the barrier panel 164. That is, when the image frame 10 is displayed through the display device 100, it is disassembled into pieces of display content. Eventually the front view of the image 20 can be illustrated as shown in FIG. 4. In practice, since the display barrier between two contents is relatively narrow, it can reduce the impact on the final display effects observed by users with eyes as much as possible.

Figure 5:
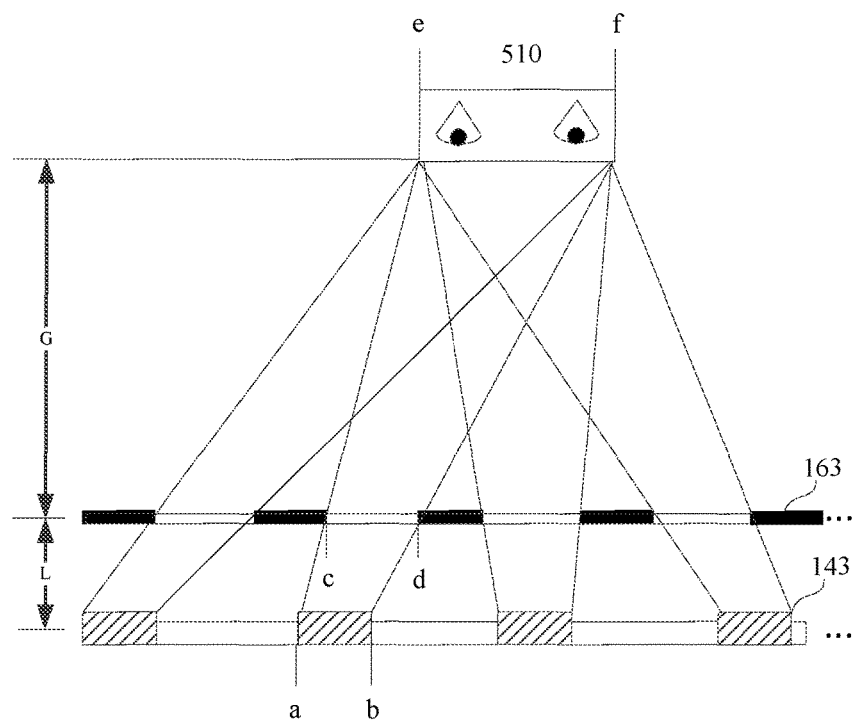
FIG. 5 is a schematic diagram of principles of the display device.

As shown in FIG. 5, the left side is established as a first direction in FIG. 5 and right side is established as a second direction. Each display area 143 has an edge a in the first direction and an edge b in the second direction. Above each display area 143 there are two corresponding display barriers 163 whose electrodes are in on state, wherein one display barrier 163 in the second direction has an edge c and the other in the first direction has an edge d. The predetermined visible range has an edge e in the first direction and an edge f in the second direction.

For each display area 143, a rule must be satisfied among its edges: edges a, c, and e are on the same plane, edges b, d, and f are on the same plane, so that content displayed on the each display area 143 can be guaranteed completely visible only within the predetermined visible range.

Additionally or alternatively, since the predetermined visible range is only for users' vision, the width 510 of the predetermined visible range is set based upon the distance between a user's two user eyes. Here, the width 510 between edges e and f is usually a bit wider than the distance between two user eyes. That is, the width 510 of the predetermined visible range is set based upon the distance between two user eyes.

In one or more embodiments, since the position of user eyes is changeable and the distance G between user eyes and barrier panel 164 is changeable, the predetermined visible range becomes changeable. In this case:

The controller 120 is also configured to send a third instruction corresponding to the first instruction to the display driver 142 at the same time it sends the first instruction to the barrier driver 162. The display driver 142 is configured to determine the position of the display areas 143 which are parallel and distributed at predetermined intervals on the display panel 144 according to the third instruction; dissemble the image frame and obtain the corresponding display content to each liquid crystal display area 143; drive each liquid crystal display area 143 to display the corresponding display content according to the position. The third instruction is configured to determine the position for each individual display area 143.

The first instruction is configured to trigger the barrier driver 162 to turn on the electrodes of the first display barriers at either odd or even number positions on barrier panel 164.

The corresponding positions of the display area 143 on display panel 144 when the electrodes of the display barriers at odd number positions in the barrier panel 164 are turned on are different with those when the electrodes of the display barriers at even number positions in the barrier panel 164 are turned on. Therefore, the third instruction corresponds to the first instruction.

Alternatively or additionally, the controller 120 can dynamically determine the position for each display area 143 based upon the rules shown in FIG. 5. The controller 120 may determine the position for each display area 143 according to the distance, the coordinates of user eyes projected on the barrier panel 164, the distance G between user eyes and barrier panel 164, and the distance L between the barrier panel 164 and display panel 144.

Optionally, the display device includes an ultrasonic transmitter transmitting ultrasonic waves within the distance G between user eyes and barrier panel 164, and a sonic receiving apparatus receiving the ultrasonic waves reflected at the position of user face. The controller 120 calculates the elapsed time between the moment when the ultrasonic waves are transmitted and the moment when they are received. The distance between user face and the display device can be approximately seen as the distance G between user eyes and barrier panel 164 which can be calculated by way of multiplying half of the elapsed time by sound velocity. Optionally, the distance G between user eyes and barrier panel 164 can also be calculated with other methods. For example, the calculation can be implemented through an infrared transmitter, an infrared receiver or a distance sensor, and the present embodiment is not limited hereto.

Optionally, the display device also includes a camera. A front camera on the display device collects user images and the display device identifies user face from the user images to determine the positions of user eyes. The width 510 can be obtained based on the distance between two user eyes in the user image and the distance G. For example, the width 510 may be calculated based on the distance between the user's two eyes in an image obtained by the display device. Optionally, the width 510 can also be determined with other methods, such as iris identification. The present disclosure does not limit the specific methods to obtain the width 510, In summary, the display device may send a first instruction to the barrier driver through the controller. The barrier driver then turns on the electrodes of the first display barriers in the barrier panel to block light. Apart from the first display barriers, the second display barriers allow light to pass through. Since the first display barriers in the barrier panel block light, users can only see the image frame within the predetermined visible range through the second display barriers. When the sight goes beyond the predetermined visible range, the image frame may become blur or incompletely visible due to the blocking by the first display barriers. It solves the issue of high visibility and exposure of the content displayed on wide viewing angle display device to other people and achieves the desired effect that the visible range of the display panel can be limited to a certain predetermined visible range and the image frame becomes completely or incompletely invisible when the sight goes beyond the predetermined visible range.

Additionally or alternatively, after the controller sends a second instruction to the barrier driver, the barrier driver turns on the electrodes of all display barriers in the barrier panel according to the second instruction so that the effect of blocking the whole screen can be achieved and user's privacy can be further protected.

Additionally or alternatively, after the controller sends a third instruction corresponding to the first instruction to the display driver, the display driver determines the position of each display area according to the third instruction to make the position of display area be corresponding to the position of the display barrier whose the electrode is in on state in the barrier panel and the content in the display area visible to users within the predetermined visible range.

Additionally or alternatively, the controller can determine the position of each display area according to a first distance between two user eyes, the coordinates of user eyes projected on the barrier panel, a second distance between user eyes and barrier panel, a third distance between barrier panel and display panel to make the predetermined visible range dynamic and determine the position of the display area associated with the position of the user eyes.

Additionally or alternatively, having the electrodes of the display barriers at odd number positions in the barrier panel connected to the first signal line and the electrodes of the display barriers at even number positions in the barrier panel connected to the second signal line makes the barrier driver be able to send a drive signal through different signal lines to switch screen to narrow viewing angle or blocking state.

Here, the idle area 145 between two adjacent display areas 143 on display panel 144 may also be configured to display preset masked display content. Masked display content refers to the display content being visible beyond the predetermined visible range. Masked display content can disguise the image frame displayed on the display areas 143. For example, the displayed image frame is a game image while the masked one is a website image. Here, when the feature is turned on, the game image is only visible in the predetermined visible range while the website image is visible beyond the range.

Figure 6:
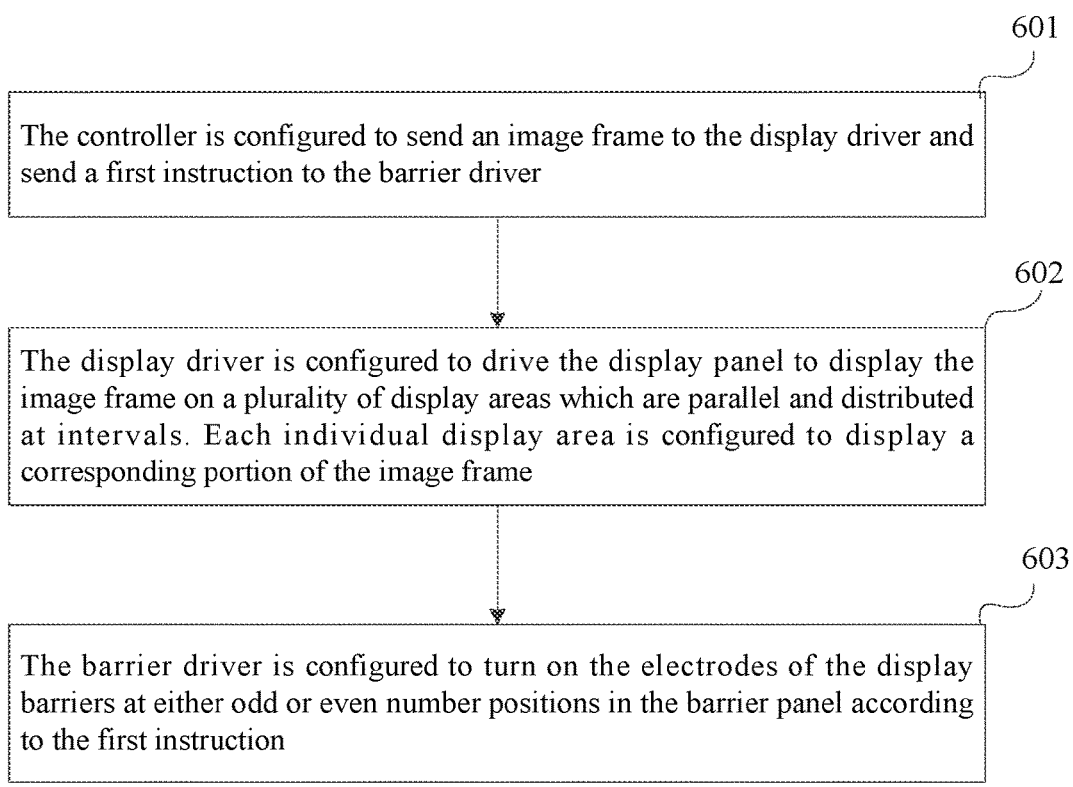
FIG. 6 is a flow diagram of a display method shown in accordance with an aspect of the disclosure.

FIG. 6 is a flow chart of a display method shown in accordance with an exemplary embodiment. This method is applied to the display device. The display device includes: a controller, a display driver and a barrier driver which are connected to the controller, a display panel which is connected to display driver, a barrier panel which is disposed above the display panel and connected to the barrier driver, and a plurality of display barriers which are parallel and distributed at intervals in the barrier panel. The method comprising:

At step 601, the controller sends an image frame to display driver and a first instruction to the barrier driver.

At step 602, the display driver drives the display panel to display the image frame on the display areas which are parallel and distributed at intervals. Each display area displays its corresponding portion of the image frame.

Distributed at intervals means that there is an interval area between two display areas.

At step 603, the barrier driver turns on the electrode of the first display barrier which is at either odd or even number position in the barrier panel according to the first instruction.

The first display barrier whose electrode is in on state blocks light. The second display barrier whose electrode is in an off state allows light to pass through.

Each individual display area displays its corresponding content and directs the content to the predetermined visible range through the display barrier whose electrode is in an off state in the barrier panel. Thus, the corresponding content is viewable within the predetermined visible range.

In summary, the display method may be implemented in a display device, which includes a barrier driver and a controller. The controller is configured to send the first instruction to the barrier driver. The barrier driver then turns on the electrodes of the first display barriers at either odd or even number positions in the barrier panel according to the first instruction to block light. Apart from the first display barriers, the second display barriers allow light to pass through. Since the first display barriers in the barrier panel block light, users can only see the image frame within the predetermined visible range through the second display barriers. When the sight goes beyond the predetermined visible range, the image frame may become blur or incompletely visible due to the blocking of the first display barriers. It solves the issue of high visibility and exposure of the content displayed on wide viewing angle display device to other people and achieves the desired effect that the visible range of the display panel can be limited to a certain predetermined visible range and the image frame becomes completely invisible or incompletely visible when the sight goes beyond the predetermined visible range.

In one optional embodiment shown in FIG. 6, the method may include following steps.

At step 601, the controller sends the image frame to the display driver. Since display streaming usually includes a sequence of image frames, this step may be executed multiple times periodically or executed when display frames change. For example, the controller executes this step every $\frac{1}{24}$ second.

At step 602, display driver drives the display panel to display the image frame on the display areas which are parallel and distributed at intervals. Each display area displays its corresponding portion of the image frame.

In one possible embodiment, the controller is able to determine the position of each display area in accordance with the distance between user eyes, the coordinates of user eyes projected on the barrier panel, the distance between user eyes and barrier panel, and the distance between barrier panel and display panel.

After the position for each display area is determined, the controller sends the third instruction to the display driver. The third instruction is configured to determine the position of each display area. Correspondingly, the step can be replaced with the following steps.

1. The display driver determines the positions of the display areas which are parallel and distributed at intervals on the display panel according to the third instruction, 2. After the image frame is dissembled by the display driver, the content corresponding to each display area will be obtained.

3. The display driver drives each display area to display the corresponding content.

Here, each display area displays its corresponding content. The content can only go through light transmitting area between two adjacent display barriers in the barrier panel and be cast within the predetermined visible range. Optionally, the predetermined visible range is determined by the distance between user eyes.

Optionally, after the controller sends the second instruction to the barrier driver, the barrier driver turns on the electrodes of all display barriers according to the second instruction, Optionally, the barrier driver sends a drive signal to the display barriers at odd number positions in the barrier panel through the first signal line. The electrodes of the display barriers on the display panel at odd number positions are connected to the first signal line; the barrier driver sends a drive signal to the display barriers at even number positions in the barrier panel through the second signal line. The electrodes of the display barriers in the barrier panel at even number positions are connected to the second signal line.

Optionally, the display driver turns the idle area between the two adjacent display areas on the display panel to the non-working state or displays the predetermined masked content on the display panel.

In summary, the display method described in the presently disclosed embodiment is that the first instruction is sent to the barrier driver through the controller. The barrier driver then turns on the electrodes of the first display barriers in the barrier panel according to the first instruction to block light. Apart from the first display barriers, the second display barriers allow light to pass through. Since the first display barriers in the barrier panel block light, users can only see the image frame within the predetermined visible range through the second display barriers. When the sight goes beyond the predetermined visible range, the image frame may become blur or incompletely visible due to the blocking of the first display barriers. It solves the issue of high visibility and exposure of the content displayed on wide viewing angle display device to other people and achieves the desired effect that the visible range of the display panel can be limited to a certain predetermined visible range and the image frame becomes completely or incompletely invisible when the sight goes beyond the predetermined visible range.

Additionally or alternatively, after the controller sends the second instruction to the barrier driver, the barrier driver turns on the electrodes of all display barriers according to the second instruction so that the effect of blocking the whole screen can be achieved and user's privacy can be further protected.

Additionally or alternatively, after the controller sends the third instruction corresponding to the first instruction to the display driver, the display driver determines the position for each display area according to the third instruction to make the position of the display area be corresponding to the position of the display barrier whose electrode is in on state in the barrier panel and content in the display area visible to users within the predetermined visible range.

Additionally or alternatively, the controller can determine the position of each display area according to the distance between two user eyes, the coordinates of user eyes projected on the barrier panel, the distance between user eyes and barrier panel, the distance between barrier panel and display panel to make the predetermined visible range dynamic and determine the position of the display area associated with the position of the user eyes.

Additionally or alternatively, having the electrodes of the display barriers at odd number positions in the barrier panel connected to the first signal line and the electrodes of the display barriers at even number positions in the barrier panel connected to the second signal line makes the barrier driver be able to send the drive signal through different signal lines to switch screen to narrow viewing angle or blocking state.

The barrier driver may be configured to turn on the electrodes of first display barriers in the barrier panel according to the first instruction. The first display barriers are at the odd or even number positions in the barrier panel and configured to block light. Apart from the first display barriers, second display barriers are configured to allow light to pass through.

Each display area displays its corresponding content. The content can pass through the second display barriers in on state and is directed within the predetermined visible range.

Optionally, the controller may also be configured to send a second instruction to the barrier driver;

The electrode of each display barrier can be turned on according to the second instruction by the barrier driver.

Optionally, at the same time the controller sends the first instruction to the barrier driver, the controller sends a third instruction corresponding to the first instruction to the display driver;

The display driver may be configured to determine the positions of the display areas which are parallel and distributed at intervals on the display panel according to the third instruction, disassemble the image frame and obtain the corresponding display content for each individual display area, and drive each individual display area to display its corresponding content according to its position.

Optionally, the third instruction is configured to determine the position of each display area. The controller is able to determine the position of each display area according to the distance between two user eyes, the coordinates of user eyes projected on the barrier panel, the distance between user eyes and the barrier panel, and the distance between the barrier panel and the display panel.

Optionally, the electrodes of the display barriers in the barrier panel at odd number positions are connected to a first signal line; the electrodes of the display barriers in the barrier panel at even number positions are connected to a second signal line.

In one optional embodiment, the electrodes of the display barriers at odd number positions in the barrier panel are connected to a first signal line; the electrodes of the display barriers at even number positions in the barrier panel are connected to a second signal line.

In one optional embodiment, the controller is configured to send a first instruction to the barrier panel through the first signal line, the first instruction is configured to turn on the electrodes of the display barriers at odd number positions in the barrier panel; or, the controller is configured to send the first instruction to the barrier panel through the second signal line, the first instruction is configured to turn on the electrodes of the display barriers at even number positions in the barrier panel.

In one optional embodiment, the controller is configured to send a second instruction to the barrier panel through the first signal line and the second signal line, the second instruction is configured to turn on the electrodes of all the display barriers in the barrier panel.

In one optional embodiment, each display barrier has the same length and width.

In one optional embodiment, there are at least two display barriers that have the same length but different width.

In one optional embodiment, the width of the display barriers at the odd number positions in the barrier panel is less than the width of the display barriers at the even number positions in the barrier panel.

The technical solution that the present disclosure provides may bring the following benefits. The controller sends the first instruction to the barrier driver. The barrier driver turns on the electrodes of the first display barriers in the barrier panel to block light. Apart from the first display barriers, second display barriers allow light to pass through. Because the first display barriers in the barrier panel block light, users can only see the image frame within the predetermined visible range through the second display barriers. The sight goes beyond the predetermined visible range and the image frame may become blur or incompletely visible due to the blocking of the first display barriers. Therefore, the issue of easy exposure of the content displayed on wide viewing angle display device to other people around can be solved; meanwhile this solution successfully narrows the visible range down to a predetermined visible range and makes the image frame invisible or incompletely visible when the sight goes beyond the predetermined visible range.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise, It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure may be possible to those skilled in the art, upon taking into consideration of the specification and practice of the invention disclosed herein. The present application is intended to cover any variations, uses, or adaptations of the present disclosure, which follow the general principles of the present disclosure and include the common general knowledge or conventional technical solution in the art without departing from the present disclosure. The specification and embodiments are exemplified, and the true scope and spirit of the present disclosure can be indicated by the following claims.

Understandably, the present disclosure is not limited to the precise constructions described above and shown in the enclosed drawings, and various modifications and changes may be made without departing from the scope thereof. The scope of the present disclosure is limited only by the appended claims.

What is claimed is:

1. A display device comprising: a display driver; a barrier driver; a controller connected to both the display driver and the barrier driver; a display panel connected to the display driver; and a barrier panel above the display panel and connected to the barrier driver, wherein the barrier panel comprises a plurality of display barriers that are distributed parallel and adjacently to each other; wherein the controller is configured to send an image frame to the display driver and send a first instruction to the barrier driver; wherein the display driver is configured to drive the display panel to display the image frame on a plurality of display areas which are parallel and distributed at intervals, each individual display area is configured to display a corresponding portion of the image frame; wherein the barrier driver is configured to control one or more display barriers in the barrier panel according to the first instruction such that the image frame is at least partially blocked when viewed outside of a predetermined visible range: wherein the display barriers at odd number positions in the barrier panel are electronically connected to a first signal line, and the display barriers at even number positions in the barrier panel are electronically connected to a second signal line; wherein a first width of each of the display barriers at the odd number positions in the barrier panel is less than a second width of each of the display barriers at the even number positions in the barrier panel.

2. The display device of claim 1, wherein the barrier panel comprises first display barriers interleaved with second display barriers;
   wherein when receiving the first instruction, the barrier driver controls the first display barriers to block light and controls the second display barriers allow light to pass through; and
   wherein each display area displays a corresponding content that passes through the second display barriers and is viewable within the predetermined visible range.

3. The display device of claim 2, wherein the controller is further configured to send a second instruction to the barrier driver; and
   wherein the barrier driver is configured to turn on electrodes of the display barriers in the barrier panel according to the second instruction.

4. The display device of claim 3 wherein,
   the controller is further configured to send a third instruction corresponding to the first instruction to the display driver at the same time sending the first instruction to the barrier driver; and
   the display driver is configured to determine positions of a plurality of display areas which are parallel and distributed at intervals on the display panel according to the third instruction; disassemble the image frame and obtain the display content corresponding to each individual display area; and drive each individual display area to display its corresponding content according to the positions.

5. The display device of claim 4, wherein the third instruction is configured to determine a position of each display area; and
   the controller is configured to determine the position of each display area according to a first distance between two user eyes, coordinates of user eyes projected on the barrier panel, a second distance between user eyes and the barrier panel, and a third distance between the barrier panel and the display panel.

6. A method implemented by a display device, wherein the display device comprises a controller, a display driver and a barrier driver connected to the controller, a display panel connected to the display driver, and a barrier panel which is disposed above the display panel and connected to the barrier driver, and a plurality of display barriers which are parallel and distributed adjacently in the barrier panel; the method comprising: sending an image frame to the display driver and sending a first instruction to the barrier driver by the controller; driving a plurality of display areas which are parallel and distributed at intervals on the display panel to display the image frame by the display driver, each individual display area is configured to display its corresponding portion of the image frame; controlling one or more display barriers in the barrier panel according to the first instruction such that the image frame is at least partially blocked when viewed outside of a predetermined visible range; sending drive signal to the display barriers at odd number positions in the barrier panel through the first signal line by the barrier driver, the electrodes of the display barriers at odd number positions in the barrier panel are connected to the first signal line: and sending drive signal to the display barriers at even number positions in the barrier panel through the second signal line by the barrier driver, electrodes of the display barriers at even number positions in the barrier panel are connected to the second signal line; wherein a first width of each of the display barriers at the odd number positions in the barrier panel is less than a second width of each of the display barriers at the even number positions in the barrier panel.

7. The display method of claim 6, further comprising:
   turning on electrodes corresponding to a first display barriers in the barrier panel according to the first instruction from the barrier driver, wherein the first display barriers block light from passing through when energized, wherein the first display barriers are interleaved with a second display barriers which allow light to pass through; and
   displaying a corresponding content in each display area such that the corresponding content passes through the second display barriers and is directed within the predetermined visible range.

8. The display method of claim 7 further comprising:
   sending a second instruction to the barrier driver by the controller; and
   turning on all of the electrodes of the display barriers in the barrier panel by the barrier driver according to the second instruction.

9. The display method of claim 6 further comprising:
   sending a third instruction corresponding to the first instruction to the display driver by the controller at the same time sending the first instruction to the barrier driver;
   driving a plurality of display areas which are parallel and distributed at intervals on the display panel to display the image frame by the display driver comprises:
   determining positions of a plurality of display areas which are parallel and distributed at intervals on the display barrier by the display driver according to the third instruction;
   disassembling the image frame and obtaining the corresponding display content for each individual display area by the display driver; and
   driving each display area to display its corresponding content according to its position by the display driver.

10. The display method of claim 9 wherein the third instruction is configured to determine a position of each display area, the method further comprising:
    determining the position of each display area by the controller according to a first distance between two user eyes, coordinates of user eyes projected on the display barrier panel, a second distance between user eyes and display barrier panel, and the distance between display barrier panel and display panel.

11. A display device comprising: a controller; a display driver and a barrier driver connected to the controller; a display panel connected to the display driver; and a barrier panel disposed above the display panel and connected to the barrier driver, wherein a plurality of display barriers are parallel and distributed adjacently in the barrier panel; wherein the display barriers are configured to block light when corresponding electrodes are in an on state; the display barriers are configured to allow light to pass through when the corresponding electrodes are in an off state; wherein the electrodes of the display barriers at odd number positions in the barrier panel are connected to a first signal line; and wherein the electrodes of the display barriers at even number positions in the barrier panel are connected to a second signal line; wherein a first width of each of the display barriers at the odd number positions in the barrier panel is less than a second width of each of the display barriers at the even number positions in the barrier panel.

12. The display device of claim 11, wherein the controller is configured to send a first instruction to the barrier panel through the first signal line, the first instruction is configured to turn on the electrodes of the display barriers at odd number positions in the barrier panel.

13. The display device of claim 11, wherein the controller is configured to send the first instruction to the barrier panel through the second signal line, the first instruction is configured to turn on the electrodes of the display barriers at even number positions in the barrier panel.

14. The display device of claim 11, wherein the controller is configured to send a second instruction to the barrier panel through the first signal line and the second signal line, the second instruction is configured to turn on the electrodes of all the display barriers in the barrier panel.

15. The display device of claim 11 wherein each display barrier has the same length and width.

16. The display device of claim 11 wherein there are at least two display barriers that have the same length but different width.

* * * * *